(12) United States Patent
Carter

(10) Patent No.: US 7,896,416 B2
(45) Date of Patent: Mar. 1, 2011

(54) DEER CARCASS TRANSPORT ASSEMBLY

(76) Inventor: Gregory Carter, Lakehurst, NJ (US)

( * ) Notice: Subject to any disclaimer, the term of this patent is extended or adjusted under 35 U.S.C. 154(b) by 66 days.

(21) Appl. No.: 12/378,705

(22) Filed: Feb. 19, 2009

(65) Prior Publication Data

US 2009/0224562 A1  Sep. 10, 2009

Related U.S. Application Data

(60) Provisional application No. 61/068,009, filed on Mar. 5, 2008.

(51) Int. Cl.
*A01M 31/00* (2006.01)

(52) U.S. Cl. .................. 294/167; 294/141; 294/146; 294/153; 452/189

(58) Field of Classification Search ............. 294/167, 294/141, 153, 146; 452/187–192
See application file for complete search history.

(56) References Cited

U.S. PATENT DOCUMENTS

| | | | | |
|---|---|---|---|---|
| 812,861 A | * | 2/1906 | Martin | 452/187 |
| 1,020,843 A | * | 3/1912 | Petersen | 452/189 |
| 2,697,000 A | * | 12/1954 | Giffin | 294/15 |
| 2,809,069 A | * | 10/1957 | Neel | 452/192 |
| 2,812,206 A | * | 11/1957 | Brunn | 452/192 |
| 4,909,555 A | * | 3/1990 | Blasi | 452/192 |
| 5,938,521 A | * | 8/1999 | Jasek et al. | 452/192 |
| D603,014 S | * | 10/2009 | Rice | D22/199 |
| 7,654,593 B2 | * | 2/2010 | Hjort | 294/81.56 |

* cited by examiner

*Primary Examiner*—Paul T Chin
(74) *Attorney, Agent, or Firm*—Clifford G. Frayne

(57) ABSTRACT

A deer carcass transport assembly including a handle member to which are attached two U-shaped hooks in planar relationship, one leg of each hook secured to an end of the handle member, the legs of the U-shaped hook spaced apart sufficiently so as to engage the hind hock of the rear legs of a deer carcass so as to permit the hunter to drag the deer carcass, by means of the hind hooves, from the kill site to a suitable means of transportation.

1 Claim, 7 Drawing Sheets

US 7,896,416 B2

DEER CARCASS TRANSPORT ASSEMBLY

RELATED APPLICATIONS

Applicant claims the benefit of provisional application Ser. No. 61/068,009, filed Mar. 5, 2008.

BACKGROUND OF THE INVENTION

1. Field of the Invention

The present invention relates to an apparatus for use by a hunter for facilely transporting a deer carcass from the kill site to a more suitable form of mobile transportation by dragging the deer by its hind legs.

2. Description of the Prior Art

A problem facing deer hunters is the transportation of the deer carcass from the kill site back to a more suitable form of mobile transportation, such as a truck, car, van or the like. Deer, being skittish animals, normally prefer to remain in areas which provide cover and camouflage pursuant to their natural survival instincts. As such, the deer hunter normally can drive to a certain location and park his vehicle, but then the deer hunter must enter the woods or fields in order to locate or track deer. The deer hunter may remain on the ground stalking the deer, or the deer hunter may utilize a tree stand in which the deer hunter sits a height above the ground in the hopes that the deer will pass within sight. In either instance, the deer hunter may have to travel a considerable distance from his vehicle in order to locate a deer.

If the hunter is successful in locating a deer and killing the deer, the deer hunter then faces the task of transporting the deer carcass from the kill site back to his vehicle. In some instances, the deer hunter may utilize an all terrain vehicle, however, such a vehicle may not be allowed in the territory where the deer hunter is hunting. Various sled-like apparatus have been utilized, but these are bulky to carry while the deer hunter is stalking the deer, and interfere with the silence required which the deer hunter wishes to maintain while stalking a deer. Applicant's apparatus is a lightweight transport assembly easily carried by the hunter, and utilized to engage the hind hocks of the deer such that the hunter can lift the hind legs to a reasonable height and pull the carcass along the ground back to his vehicle.

OBJECTS OF THE INVENTION

An object of the present invention is to provide for a novel lightweight deer carcass transport assembly which allows the hunter to drag the deer from the kill site to a suitable transportation means.

Another object of the present invention is to provide for a novel deer carcass transport assembly which is lightweight and can be carried by the hunter without interfering with the hunter's ability to stalk the deer.

A still further object of the present invention is to provide for a novel deer carcass transport assembly which easily and securely engages the hind hocks of the deer carcass allowing the hunter to drag the carcass from the woods.

A still further object of the present invention is to provide for a novel deer carcass transport assembly which is collapsible and lightweight.

SUMMARY OF THE INVENTION

A deer carcass transport assembly including a handle member to which are attached two U-shaped hooks in planar relationship, one leg of each hook secured to an end of the handle member, the legs of the U-shaped hook spaced apart sufficiently so as to engage the hind hock of the rear legs of a deer carcass so as to permit the hunter to drag the deer carcass, by means of the hind hooves, from the kill site to a suitable means of transportation.

BRIEF DESCRIPTION OF THE DRAWINGS

These and other objects of the present invention will become apparent, particularly when taken in light of the following illustrations wherein.

DETAILED DESCRIPTION OF THE INVENTION

Figure 5:
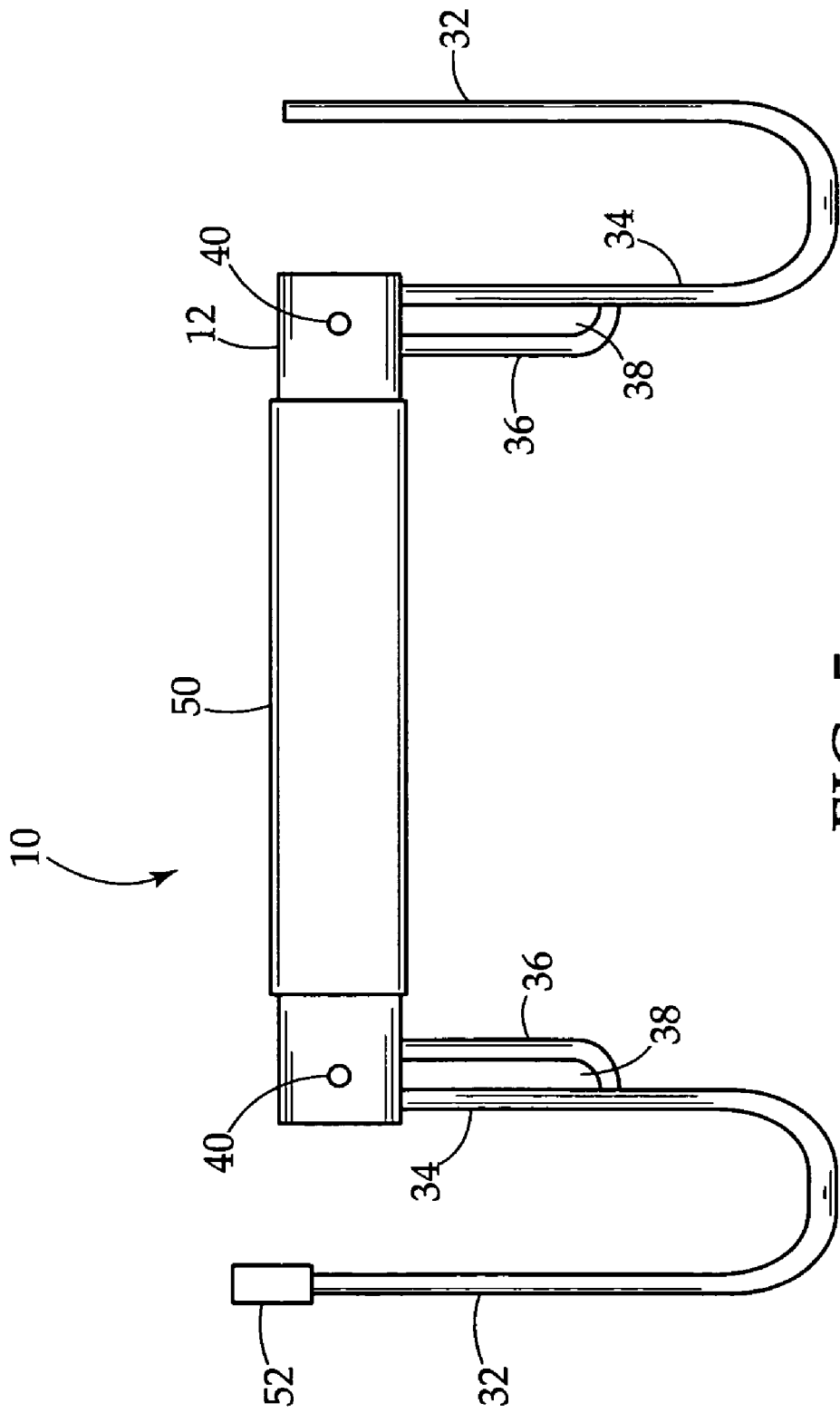
FIG. 5 is a side open view of the preferred embodiment of the transport assembly of the present invention.
Figure 6:
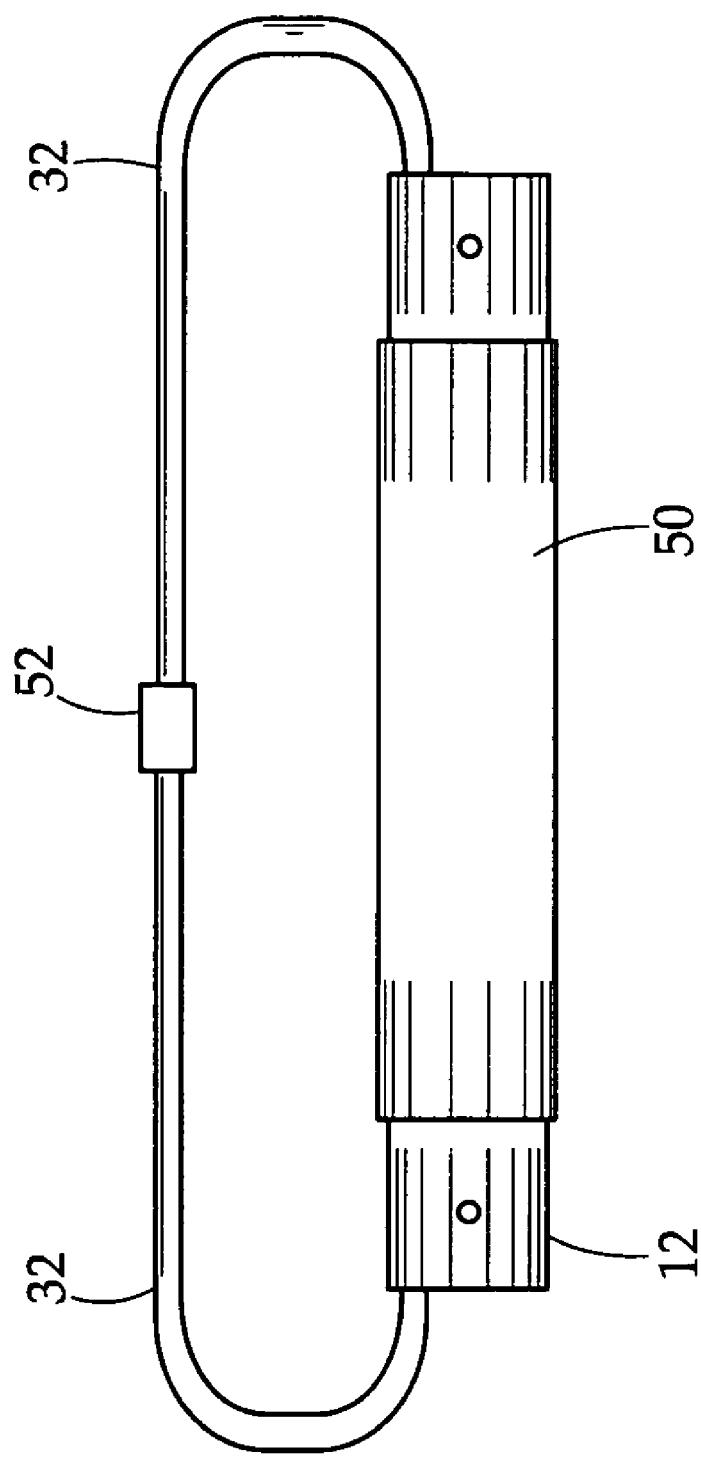
FIG. 6 is a closed view of the preferred embodiment of the transport assembly of the present invention.

FIG. 5 is a side open view and FIG. 6 is a side closed view of the preferred embodiment of the deer carcass transport assembly 10 of the present invention. The deer carcass transport assembly 10 includes a handle member 12 which is illustrated in FIGS. 1 and 2, which are a top view and a side view of the handle member 12 of the preferred embodiment of deer carcass transport assembly 10.

Figure 1:
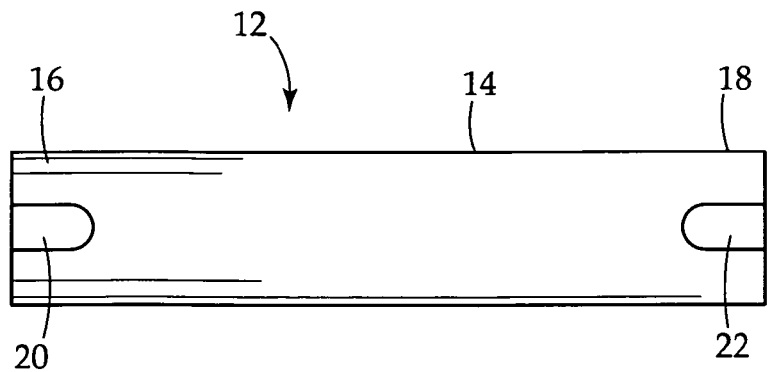
FIG. 1 is a top view of the handle member of a preferred embodiment of the transport assembly.
Figure 2:
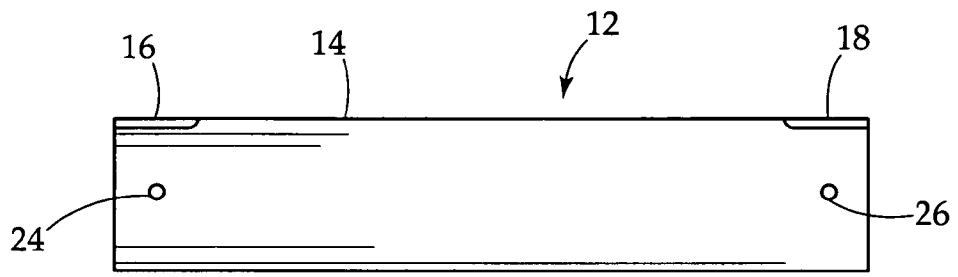
FIG. 2 is a side view of the handle member of the preferred embodiment of the transport assembly.

Referring to FIGS. 1 and 2, handle member 12 is tubular having a cylindrical side wall member 14 defining a first end 16 and a second end 18 with a throughbore 17. The first end 16 and second end 18 are formed with aligned slots 20 and 22. In 90 degree relationship with slots 20 and 22 on first end 16 and second end 18 on handle member 12 there are formed aligned apertures 24 and 26 for receipt of a pin as described hereafter.

The handle member 12 can vary in the material of construction and dimensions, however, the preferred embodiment could be fabricated of a steel tubular material of a length of 0.25 inches and a diameter of 0.75 inches. The aligned slots 20 and 22 at first end 16 and second end 18 of handle member 12 would extend 0.75 inches from first end and second end 16 and 18 respectively, and be of a width of 0.25 inches. The aligned apertures 24 and 26 would be of a diameter of 0.25 inches.

Figure 3:
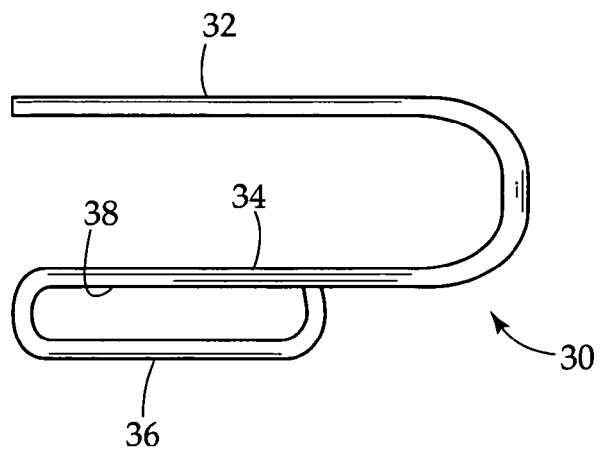
FIG. 3 is a side view of a hook member of the preferred embodiment of the transport assembly.

FIG. 3 is a side view of a hook member 30 of the preferred embodiment, which would be secured to handle member 12. Hook member 30 is generally U-shaped, having a first leg 32, a second leg 34, which second leg 34 is bent back upon itself in parallel and planar relationship with the second leg 34 and the first leg, and secured to second leg 34 forming an auxiliary leg 36 and defining a slotted aperture 38. There is a hook member 30 of the type illustrated in FIG. 3 associated with the first end 16 and the second end 18 of handle member 12.

The hook member 30 can vary in its material of construction, but in the preferred embodiment it is formed by bending a continuous rod of steel of quarter inch diameter. The dimensions of the hook member 30 may also vary, but are tied to the dimensions of the handle member to allow for the collapsibility of the transport means as described hereafter. Therefore, with respect to the handle member previously described, the hook members would have an overall length of 4.75 inches. The combined width of second leg 34, auxiliary leg 36, and slotted aperture 38 would be 0.75 inches with slotted aperture 38 having a width of 0.25 inches. The length of the auxiliary leg 36 would be 3.75 inches and the distance between first leg 32 and second leg 34 would be 1.75 inches.

Figure 4:
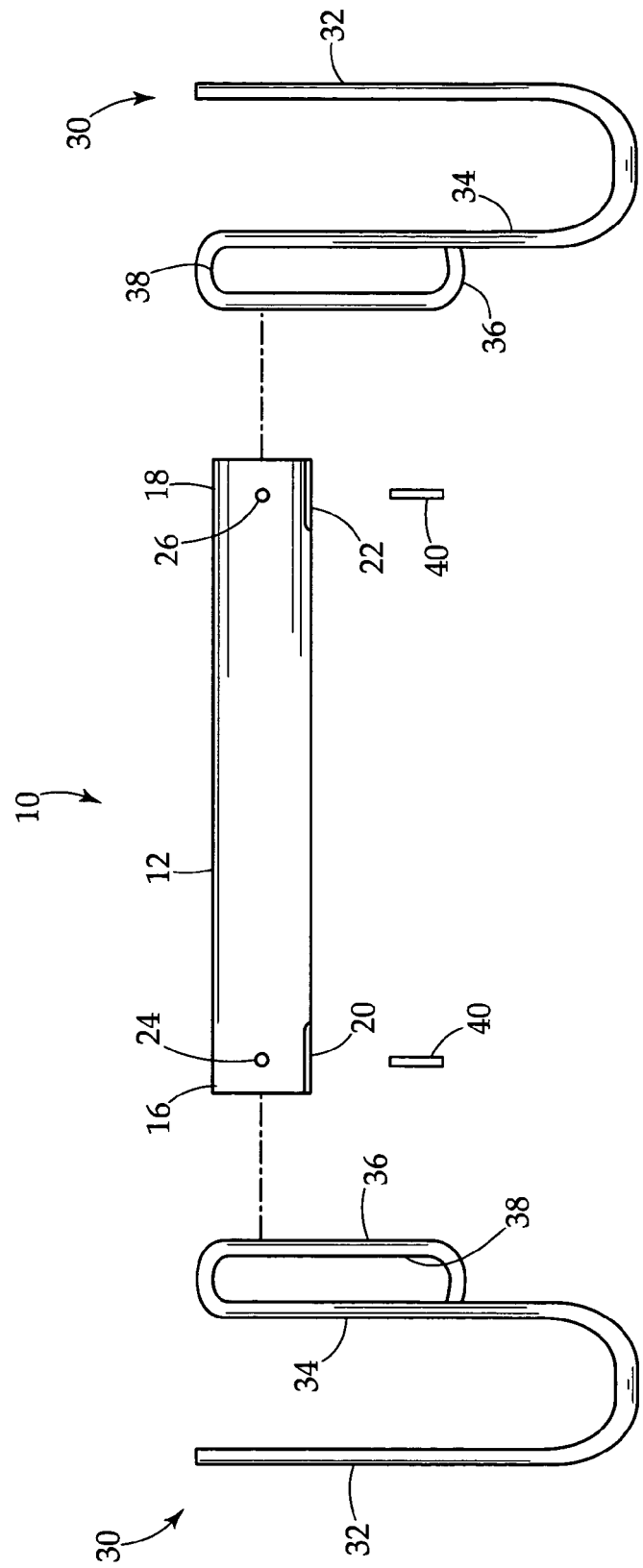
FIG. 4 is an exploded open side view of the preferred embodiment of the transport assembly of the present invention.

FIG. 4 is an exploded side view of the preferred embodiment of the deer carcass transport assembly 10 of the present invention. Second leg 34 of hook member 30 and that portion of auxiliary leg 36 bent upon itself forming slotted aperture 38 is inserted into the first end and second end 16 and 18 of handle member 12 in slots 20 and 22. Pin members 40 and 42 are then inserted through apertures 24 and 26 in the side wall 14 of handle member 12, and through slotted aperture 38 formed in the hook member 30. Pin members 40 are then secured by any suitable means to handle member 12.

When assembled for use, the transport assembly 10 is illustrated in FIG. 5. The second leg 34 and auxiliary leg 36 are secured to handle member 12 by pin members 40 and 42. Second leg 34 and auxiliary leg 36 are maintained in position by slots 20 and 22 such that the hind hock of the deer carcass can be engaged in each of the U-shaped hooks, and the hunter, grasping the handle member 12, can drag or pull the deer from the kill site. FIG. 5 further illustrates an additional accessory to the transport assembly 10 in the form of a padded handle member 50 positioned between first end 16 and second end 18 of handle member 12. Padded member 50 may be a padded wrap or a padded or foam sleeve which can be slidably inserted onto handle member 12 prior to the attachment of the U-shaped hook members 30

FIG. 5 also illustrates another accessory for the transport assembly 10. This accessory is a tubular member 52 which is partially attached to the end of the first leg 32 of one of the U-shaped hooks 30. This tubular member aids in the collapse or folding of the transport assembly 10 and storage when not in use.

The storage of the transport assembly 10 is illustrated in FIG. 6. When not in use, the U-shaped hooks 30 are rotated 90 degrees such that the second leg 34 and auxiliary leg 36 of U-shaped hooks 30 are now in alignment with handle member 12. Since handle member 12 is tubular, the second leg members 34 and auxiliary leg member 36 can be slidably received within handle member 12 by pushing them inwardly while pin members 40 ride within slotted aperture 38. The tubular member 52 on the end of one of the first legs 32 of one of the U-shaped hooks 30, is aligned with the end of the first leg 30 of the opposing U-shaped hook 30, and slidably received therein thus securing the transport assembly 10 in a closed position for storage or for carriage by the hunter in his pack or on his belt prior to its intended use of transporting a deer carcass.

Figure 7:
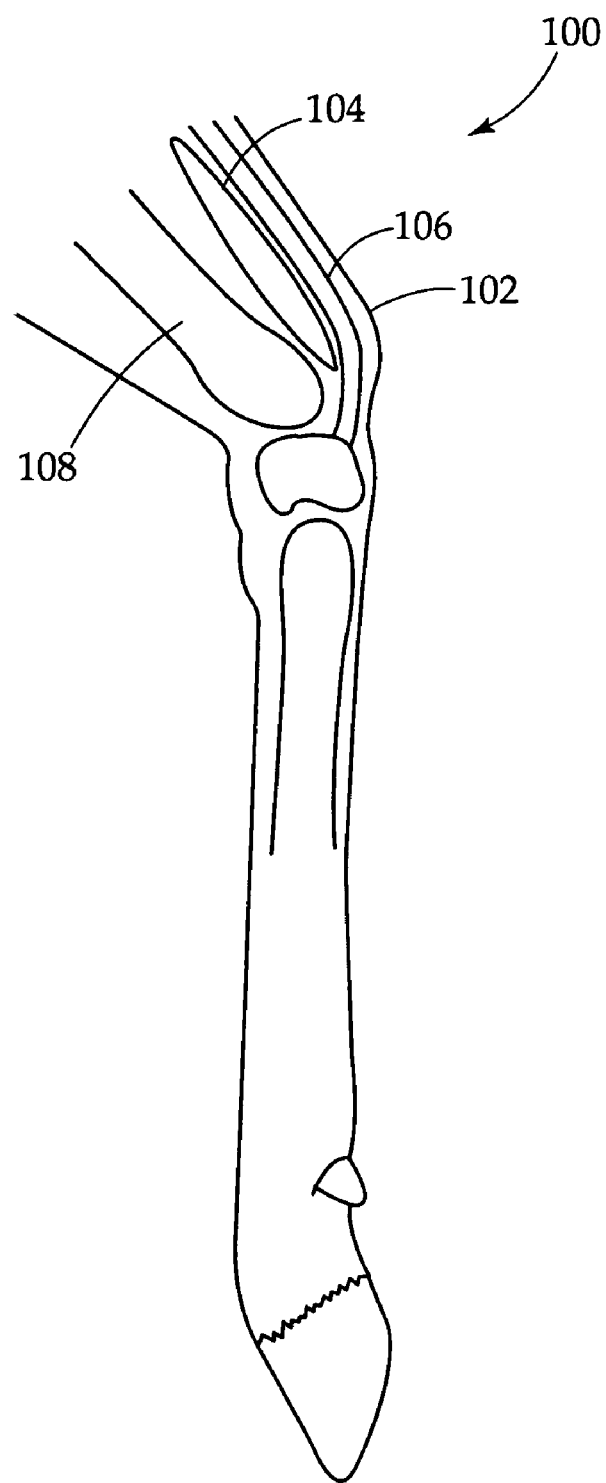
FIG. 7 is a side view of a hind hock of a deer.

FIG. 7 is a side view of the rear leg 100 of a deer identifying the hind hock 102. The user of the transport assembly of the present invention in transporting a deer carcass would make an incision 104 between the rear tendon 106 and bone 108. The hunter would make this incision on both hind hocks of the deer carcass. With incisions 104 in place, the hunter would then open the transport assembly 10 of the present invention. The hunter would insert a U-shaped hook 30 through each of the incisions made at the hind hock.

Figure 8:
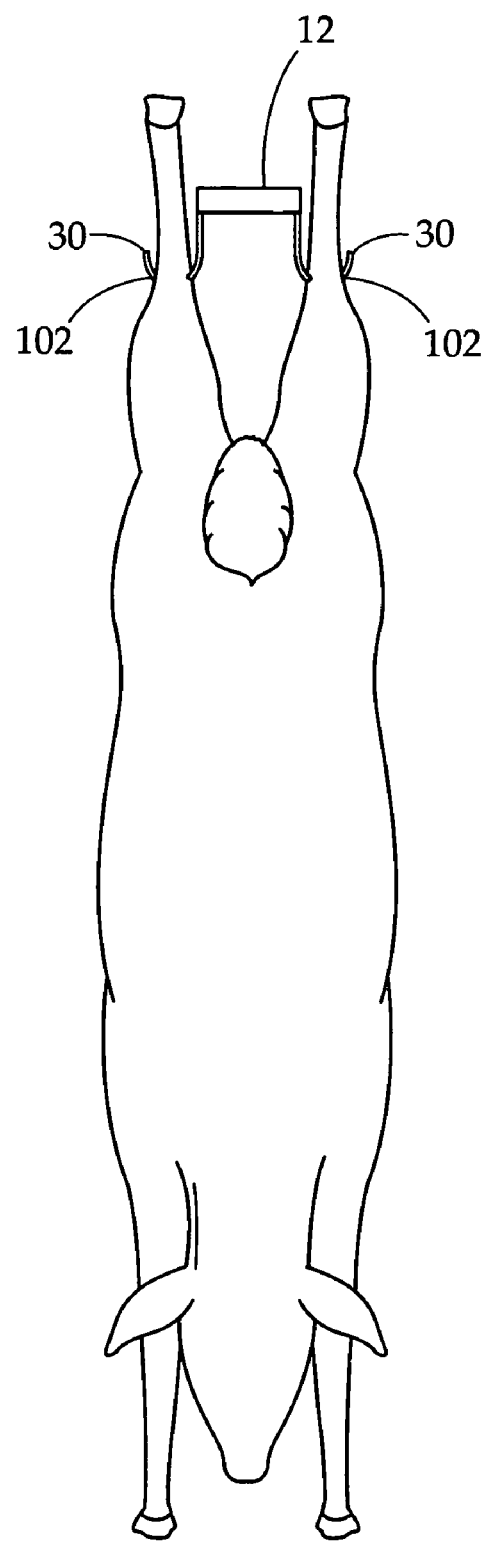
FIG. 8 illustrates the deer carcass transport assembly secured to the hind legs of a deer carcass.

FIG. 8 is a top view of a deer carcass with the transport assembly 10 so positioned such that the hunter then engages the handle member 12 so as to partially lift the hind legs of the deer off of the ground and thus enables the hunter to drag the deer carcass to a desired location.

Figure 9:
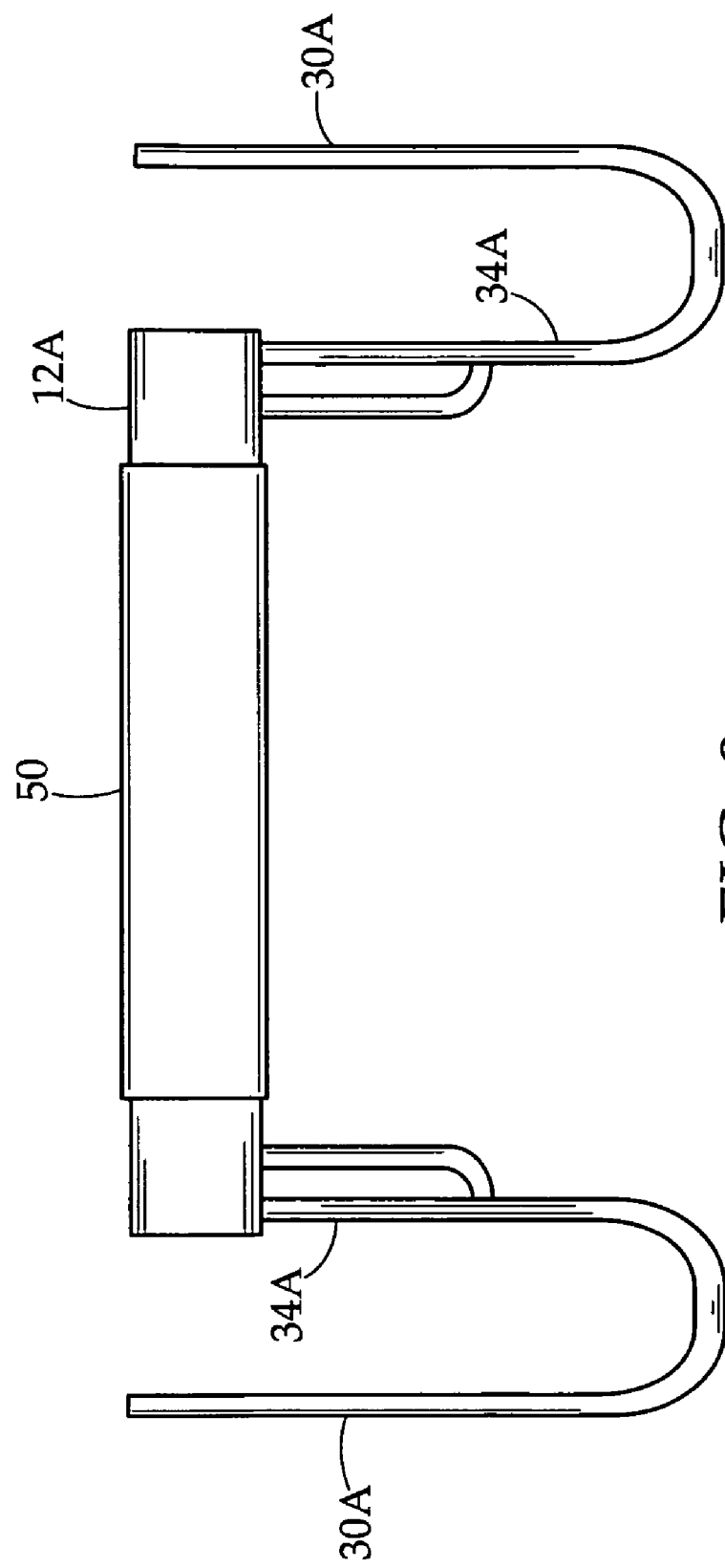
FIG. 9 is a side view of a second embodiment of the transport assembly of the present invention.

The foldability of the deer carcass transport assembly 10 of the preferred embodiment allows for the assembly to be carried easily by a hunter when stalking a deer, and then opened and secured in order to transport the deer carcass. Therefore, while the foldability for transport is an important feature of the preferred embodiment, a second embodiment as illustrated in FIG. 9 would include the elements of the preferred embodiment, however, there would be no rotation and storagability of the U-shaped hooks 30A. In the embodiment illustrated in FIG. 8, second leg 34A of the U-shaped hook 30A would be permanently affixed to the handle member 12A such that the assembly would be permanently positioned in the open position as illustrated in FIG. 5. This would allow the hunter to transport the deer carcass in the same manner as previously described, but would provide for a transport assembly which would be more bulky and which would not facilitate its being carried by the hunter during the stalking process.

Therefore, while the present invention has been disclosed with respect to the preferred embodiments thereof, it will be recognized by those of ordinary skill in the art that various changes and modifications can be made without departing from the spirit and scope of the invention. It is therefore manifestly intended that the invention be limited only by the claims and the equivalence thereof.

I claim:

1. A transport assembly for a deer carcass for the removal of the deer carcass from the field, the transport assembly comprising:

a tubular handle member having a first open end and a second open end, said tubular handle member having aligned U-shaped slots formed in the opposing first end and second end, said tubular handle member having a transverse aperture at said first end and said second end, said apertures being in 90 degree relationship with said U-shaped slots, said apertures for receipt of a locking pin;

two hind hock engageable arms, each of said hind hock engageable arms being generally U-shaped in configuration having first and second parallel legs, said first leg formed with an auxiliary leg secured to said first leg defining an enclosed slot between said first leg and said auxiliary leg, said first leg and said auxiliary leg of said hind hock engaging arms slidably receivable within said tubular handle member and slidably secured thereto by means of a locking pin positioned through said apertures in said first and second end of said handle member, and extending through said enclosed slot formed by said first leg members and said auxiliary leg on said hind hock engaging arms, said hind hock engaging arms fully slidably secured within said handle member when not in use, and slidably extended from said handle member and pivoted about said locking pin so as to engage said first leg and said auxiliary leg of said hind hock engaging arms in said slots formed in said handle member, said opposing second legs of said hind hock engaging arms spaced outwardly and apart from said first end and said second end of said handle member so as to engage by means of a slit in the skin of the hind hock, the hind hock of a deer carcass for the facile dragging of the deer carcass from the point of kill to another desired location, said second legs of said hind hock engagable arms are externally threaded at their ends and securable by an internal complimentary cylinder to provide facile transport of said transport assembly when not in use in transporting a deer.

* * * * *